(12) United States Patent
Olson

(10) Patent No.: US 8,616,576 B2
(45) Date of Patent: Dec. 31, 2013

(54) IMPLEMENT HITCH WITH RING AND CLEVIS

(75) Inventor: Brian R. Olson, Fort Qu'Appelle (CA)

(73) Assignee: Power Pin Inc., Fort Qu'Appelle, Saskatchewan (CA)

( * ) Notice: Subject to any disclaimer, the term of this patent is extended or adjusted under 35 U.S.C. 154(b) by 0 days.

(21) Appl. No.: 13/433,978

(22) Filed: Mar. 29, 2012

(65) Prior Publication Data

US 2013/0147158 A1 Jun. 13, 2013

(30) Foreign Application Priority Data

Dec. 12, 2011 (CA) ...................................... 2761378

(51) Int. Cl.
 *B60D 1/02* (2006.01)
(52) U.S. Cl.
 USPC .......................... 280/515; 280/506; 280/416.2
(58) Field of Classification Search
 USPC ....................... 280/515, 506, 416.2
 See application file for complete search history.

(56) References Cited

U.S. PATENT DOCUMENTS

| | | | | |
|---|---|---|---|---|
| 3,269,109 A | * | 8/1966 | Hart | 59/86 |
| 3,471,171 A | * | 10/1969 | Polzin et al. | 280/497 |
| 3,825,284 A | * | 7/1974 | Behrle | 280/515 |
| 4,394,031 A | * | 7/1983 | Barton et al. | 280/515 |
| 6,899,402 B2 | * | 5/2005 | Chiang et al. | 301/124.2 |
| 7,478,823 B2 | * | 1/2009 | Doubet et al. | 280/515 |
| 7,891,693 B2 | * | 2/2011 | Olson | 280/515 |

* cited by examiner

*Primary Examiner* — Tashiana Adams
*Assistant Examiner* — Marlon Arce
(74) *Attorney, Agent, or Firm* — King & Schickli, PLLC

(57) ABSTRACT

A hitch apparatus has a tongue member with drawpin hole. Upper and lower clevis straps are pivotally attached to a corresponding top and bottom sides of the tongue member about vertical pivot axes, such that the clevis straps can pivot from an operating position, where the upper clevis strap is above the drawpin hole and the lower clevis strap is below the drawpin hole, to an idle position where the clevis straps extend laterally from the tongue member. When the clevis straps are in the operating position, upper and lower clevis holes in the corresponding clevis straps are vertically aligned with the drawpin hole in the tongue member, and a recess is formed between one of the upper and lower clevis straps and the tongue member. A drawpin retainer prevents upward movement of a drawpin out of engagement with the clevis and drawpin holes.

15 Claims, 2 Drawing Sheets

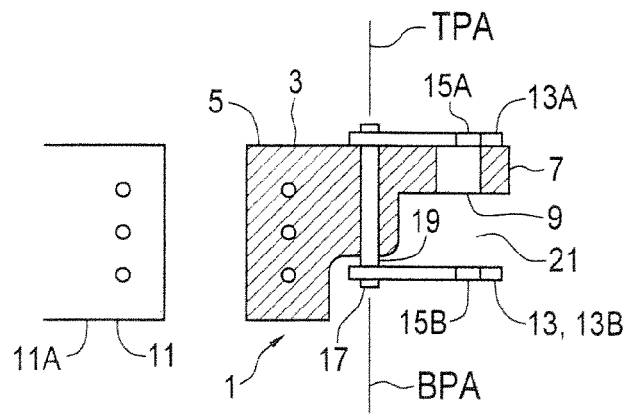
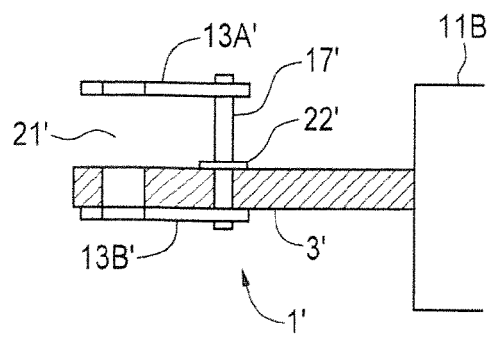
FIG. 1
FIG. 3
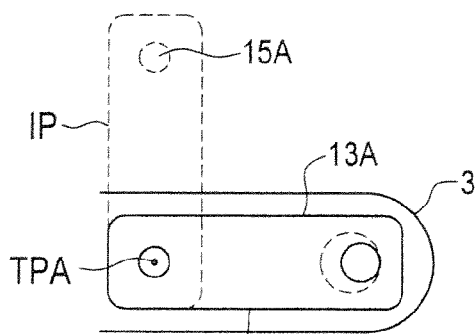
FIG. 2
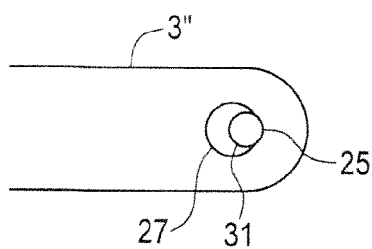
FIG. 5
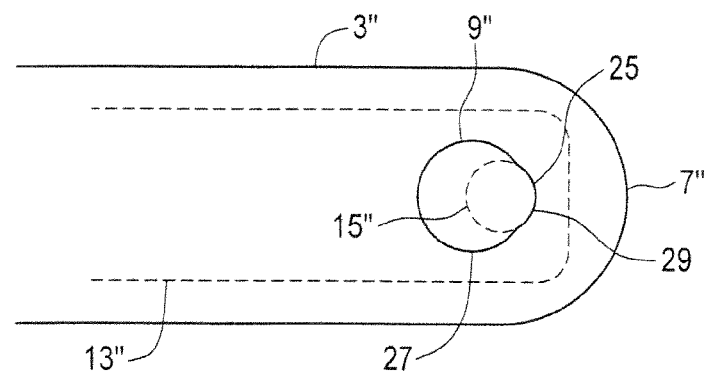
FIG. 4

IMPLEMENT HITCH WITH RING AND CLEVIS

This invention is in the field of agricultural implements and in particular an implement hitch for attaching an implement to a towing tractor.

BACKGROUND

A towed agricultural implement is typically connected to a tractor drawbar by a clevis and tongue connection. The clevis provides upper and lower clevis members each defining a draw pin hole, and the tongue defines a draw pin hole and is inserted between the clevis members to align the draw pin holes such that a draw pin can be inserted through them and thereby connect the clevis and tongue.

The clevis may be mounted to the tractor drawbar and the tongue provided by the implement hitch, or vice versa. Essentially the tractor drawbar and the implement hitch are both "tongues", and the clevis is provided by mounting a hammer strap to the tractor drawbar or to the implement hitch. A hammer strap is simply a steel riser that bolts to the tongue adjacent to the draw pin hole opposite the free end of the tongue and extends away from the tongue and then toward the free end of the tongue and over the draw pin hole in the tongue, creating a recess between the tongue and the hammer strap. The draw pin hole in the hammer strap is aligned with the draw pin hole in the tongue.

The tractor drawbar supports the weight of the front end of the implement being towed, which can be considerable. Thus the tongue of the implement hitch must be connected to the drawbar so that the implement tongue rests on the drawbar. Thus where the hammer strap is mounted to the tractor drawbar, the hammer strap is fastened to the drawbar forward of the draw pin hole in the drawbar, and then extends upward from the drawbar and then rearward over the draw pin hole in the drawbar such that the recess is above the drawbar. The implement hitch rests on the drawbar with the hammer strap above it, and the draw pin is inserted down through the aligned draw pin holes in the hammer strap, implement hitch, and drawbar.

Where the hammer strap is mounted to the implement hitch, the hammer strap is fastened to the hitch rearward of the draw pin hole in the hitch tongue, and then extends downward from the hitch tongue and then forward under the draw pin hole in the hitch tongue. Again the implement hitch tongue rests on the drawbar with the hammer strap below the drawbar, and the draw pin is inserted down through the aligned draw pin holes in the implement hitch, drawbar, and hammer strap.

Pintle hook hitches are also known where a vertically oriented hook is mounted to the towing vehicle, typically a truck. The hook is like a drawbar with a drawpin extending vertical upward. The hitch tongue of the towed vehicle has a ring on the forward end that is dropped down on the hook which extends up through the drawpin hole, and a retainer is connected to the top of the hook to keep the tongue in place. A hitch tongue with a drawpin hole therein can form the ring which drops over the hook, and be supported on the hook the same as on a drawbar.

It is common for implements and other vehicles such as wagons, trailers, and the like to be towed by a variety of different vehicles with different hitches. For example anhydrous ammonia, a very widely used liquid fertilizer product, is transported from a storage site to a farm location in a pressurized tank trailer pulled by a truck at highway speeds. Once at the farm, the truck is disconnected and the trailer is perhaps connected to a farm tractor for towing to a field location and then eventually is connected to the rear end of an applicator implement, such as an air seeder.

Often the delivery truck will have one type of hitch, such as a pintle hook, the tractor another, such as a drawbar with a hammer strap, while the air seeder will have a single tongue drawbar extending rearward. Further with respect to the example of anhydrous trailers, a dealer will typically deliver anhydrous ammonium to a large number of different farmers, each of whom will have a variety of towing vehicle with a variety of hitch mechanisms. Drawpin sizes may vary as well, and it is generally desirable to have the draw pin holes the same size so that a corresponding size of drawpin can be inserted to connect the clevis and tongue with minimal movement at the connection.

Hitch arrangements for road travel also must comply with road safety regulations, especially when transporting hazardous materials such as anhydrous ammonium.

Providing a hitch apparatus that complies with safety regulations and yet is adaptable to a variety of different vehicles is problematic.

SUMMARY OF THE INVENTION

It is an object of the present invention to provide an implement hitch apparatus that overcomes problems in the prior art.

In a first embodiment the present invention provides a hitch apparatus comprising a tongue member having a vehicle end, a free end opposite the vehicle end, and a drawpin hole defined through the tongue member in proximity to the free end. The vehicle end of the tongue member is adapted for attachment to a vehicle such that the drawpin hole is oriented substantially vertically. An upper clevis strap is pivotally attached to a top side of the tongue member about a substantially vertical top pivot axis located between the drawpin hole and the vehicle end of the tongue member such that the upper clevis strap can pivot from an operating position, where the upper clevis strap is above the drawpin hole, to an idle position, where the upper clevis strap extends laterally from the tongue member. A lower clevis strap is pivotally attached to a bottom side of the tongue member about a substantially vertical bottom pivot axis located between the drawpin hole and the vehicle end of the tongue member such that the lower clevis strap can pivot from an operating position, where the lower clevis strap is below the drawpin hole, to an idle position, where the lower clevis strap extends laterally from the tongue member. The upper and lower clevis straps define corresponding substantially vertically oriented upper and lower clevis holes, and the upper and lower clevis straps are configured such that when the upper and lower clevis straps are in the operating position, the upper and lower clevis holes are vertically aligned with the drawpin hole in the tongue member, and such that a recess is formed between one of the upper and lower clevis straps and the tongue member.

In a second embodiment the present invention provides a drawpin retainer apparatus for use on a hitch apparatus comprising a hitch member, and a substantially vertically oriented drawpin hole defined in the hitch member. The apparatus comprises a draw pin with a flange extending laterally outward from a top portion thereof. A bracket is attached to a top surface of the hitch member adjacent to the drawpin hole. A retainer key is pivotally attached at an upper portion thereof to the bracket about a substantially horizontal key pivot axis, and the retainer key is configured such that, when hanging freely, a retaining portion of a lower edge of the retainer key extends over at least a portion of the flange when the drawpin is engaged in the drawpin hole.

The present invention conveniently provides a hitch apparatus that can be converted, quickly and without tools, from a ring hitch for use with a pintle hook or clevis hitch, to a clevis hitch for use with a single hitch tongue, drawbar, or the like. A drawpin retainer prevents upward movement of the drawpin from engagement with the clevis or drawpin and can be conveniently moved to a release position to allow the drawpin to be removed, again without tools.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 1 is a schematic cutaway side view of an embodiment of a hitch apparatus of the present invention where the recess is above the tongue member;

FIG. 2 is a schematic top view of the embodiment of FIG. 1;

FIG. 3 is schematic cutaway side view of a different embodiment of a hitch apparatus of the present invention where the recess is below the tongue member;

FIG. 4 is a schematic top view of a tongue member and upper clevis strap for use with the embodiment of FIG. 1 or FIG. 2 where the drawpin hole in the tongue member includes a notch extending toward the free end thereof;

FIG. 5 is a schematic top view of a drawpin engaged in the notch of the tongue member of FIG. 4;

DETAILED DESCRIPTION OF THE ILLUSTRATED EMBODIMENTS

Figure 6:
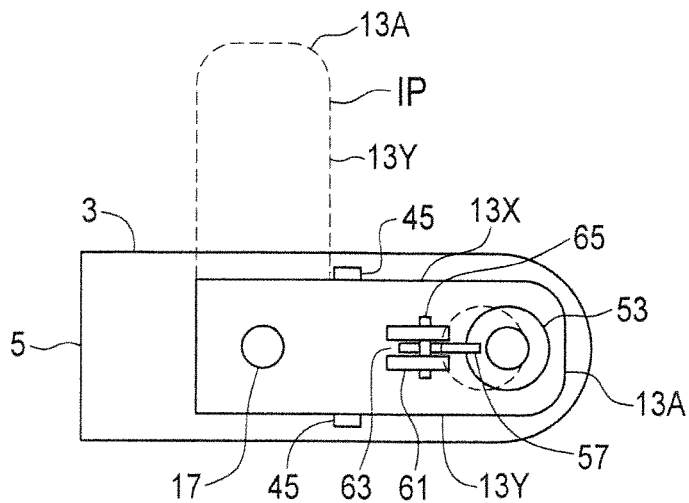
FIG. 6 is a schematic top view of a locking mechanism and a perpendicular retainer of the invention installed on the embodiment of the hitch apparatus of FIG. 1.

FIGS. 1 and 2 illustrate an embodiment of a hitch apparatus 1 of the present invention comprising a tongue member 3 having a vehicle end 5, a free end 7 opposite the vehicle end 5, and a drawpin hole 9 defined through the tongue member in proximity to the free end. The vehicle end 5 of the tongue member 3 is adapted for attachment to a vehicle 11 such that the drawpin hole 9 is oriented substantially vertically.

An upper clevis strap 13A is pivotally attached to a top side of the tongue member 3 about a substantially vertical top pivot axis TPA located between the drawpin hole 9 and the vehicle end 5 of the tongue member 3. Similarly a lower clevis strap 13B is pivotally attached to a bottom side of the tongue member 3 about a substantially vertical bottom pivot axis BPA located between the drawpin hole 9 and the vehicle end 5 of the tongue member 3. The upper and lower clevis straps 13A, 13B define corresponding substantially vertically oriented upper and lower clevis holes 15A, 15B.

As schematically illustrated in FIG. 2, the clevis straps 13 can pivot from an operating position OP, where the upper clevis strap 13A is above the drawpin hole 9 and the lower clevis strap 13B is below the drawpin hole 9, to an idle position IP, where the clevis straps 13 extend laterally from the tongue member 3. While it is contemplated that it would be possible to have the upper and lower clevis straps 13A, 13B pivot independently, and also possible to have the top and bottom pivot axes TPA, BPA in different locations, in the illustrated apparatus 1 increased convenience is provided by attaching the upper and lower clevis straps 13A, 13B to a shaft 17 extending substantially vertically through a shaft hole 19 in the tongue member 3 and coinciding with the top and bottom pivot axes TPA, BPA. The attachment to the shaft 17 is configured such that the upper and lower clevis holes 15A, 15B are aligned. Thus the upper and lower clevis straps 13A, 13B pivot together and are always aligned.

The clevis straps 13 are configured such that when the upper and lower clevis straps 13A, 13B are in the operating position, the upper and lower clevis holes 15QA, 15B are vertically aligned with the drawpin hole 9 in the tongue member 3, and such that a recess 21 is formed between one of the upper and lower clevis straps 13A, 13B and the tongue member 3.

In the apparatus of FIG. 1, the tongue member 3 is adapted for attachment to a towed vehicle 11A such as a farm implement, wagon, trailer, or the like. The recess 21 is formed between the lower clevis strap 13B and the tongue member 3. Thus when connected to a towing vehicle, the tongue member 3 will rest on the drawbar of the towing vehicle with the lower clevis strap 13B below the drawbar, and any weight on the front end of the towed vehicle 11A will be carried in the desired manner on the drawbar or pintle hook of the towing vehicle.

In a typical apparatus 1, the tongue member 3 will be a nodular iron casting while the clevis straps 13A, 13B are fabricated laser cut steel pieces. The shaft 17 is a hot rolled bar inserted through the shaft hole 19 and the clevis straps 13 are welded to the shaft 17 to make the illustrated clevis ring hitch apparatus 1 of the present invention. It is also contemplated that the shaft 17 could be threaded into the clevis straps 13, or other wise fastened, which could be useful when retrofitting the present invention to existing hitches.

FIG. 3 schematically illustrates an alternate hitch apparatus 1' where the tongue member 3' is adapted for attachment to a towing vehicle 11B. In the illustrated apparatus 1' the tongue member 3' is illustrated generally as a tractor drawbar. The recess 21' is formed between the upper clevis strap 13A and the tongue member 3' such that the tongue of a towed vehicle will rest on the tongue member 3' with the upper clevis strap 13A above the tongue of the towed vehicle and any weight on the tongue of the towed vehicle will be carried in the desired manner on the tongue member 3' attached to the towing vehicle 11B. As in the apparatus 1 of FIG. 1, the upper and lower clevis straps 13A', 13B' are attached to a shaft 17', and pivot together. A stop washer 22' is welded to the shaft 17' to keep the shaft 17' raised so the recess is above the tongue member 3'. Alternatively and for increased strength a heavy brace member could be fastened to the top of the drawbar with the shaft 17' extending up therethrough, similar to the configuration of the apparatus 1 of FIG. 1. The towing forces on the upper clevis strap 13A' tending to bend the shaft 17' then would be borne by the brace member rather than solely by the shaft 17'.

It can be seen in the apparatus 1 of FIG. 1 that the clevis holes 15 have a smaller diameter than the drawpin hole 9. In the apparatus 1' of FIG. 3, the clevis holes 15' and drawpin hole 9' are about the same size, and are configured such as would be found on a conventional tractor drawbar hitch with a hammer strap bolted to the drawbar. The holes in the drawbar and hammer strap include articulation allowances for pivoting as are known in the art, and it is contemplated that the clevis holes 15' and drawpin hole 9' would include similar allowances.

In a common application where the tongue member 3 is configured for attachment to a towed vehicle, such as an anhydrous ammonium trailer, the drawpin hole 9 would be larger enough to fit over the pintle hook of a towing vehicle, and the clevis holes 15 would be smaller to fit a smaller drawpin for attachment to the rear of an air seeder, applicator, or the like.

Where as in the apparatus 1 of FIG. 1 the clevis holes 15, and thus also the drawpin dropped through the clevis holes 15, have a smaller diameter than the diameter of the drawpin hole 9, the drawpin can move laterally in the drawpin hole 9, increasing wear and noise. The apparatus will typically be configured such that edges of the clevis holes 15 will be aligned with the edge of the drawpin hole 9 toward the free end 7 of the tongue member 3. Towing forces on a drawpin in the clevis holes 15 are exerted toward the free ends of the drawpin and clevis holes 9, 15, and with the edges aligned, much of the towing force is borne by the drawpin hole 9 rather than solely by the clevis holes 15.

FIGS. 4 and 5 schematically illustrate a tongue member 3" for use where the clevis holes 15", and thus also the drawpin 31 dropped through the clevis holes 15", have a smaller diameter than the diameter of the drawpin hole 9". The tongue member 3" defines a substantially cylindrical drawpin hole 9" that also has a notch 25 extending toward the free end 7" of the tongue member 3" from the cylindrical portion 27 of the drawpin hole 9".

When the upper and lower clevis straps 13" are in the illustrated operating position, edges 29 of the clevis holes 15" are aligned with the edges of the notch 25 as the notch 25 has a radius corresponding the that of the clevis holes 15". Thus a drawpin 31 with a diameter substantially the same as the diameter of the clevis holes 15", and dropped through the clevis holes 15" will engage the notch 25 such that lateral movement of the drawpin 31 in the generally larger drawpin hole 9" is prevented. When used with a full size drawpin, a portion of the bearing surface of the drawpin hole 9 is removed, but generally sufficient bearing surface will remain to function and wear satisfactorily.

Figure 7:
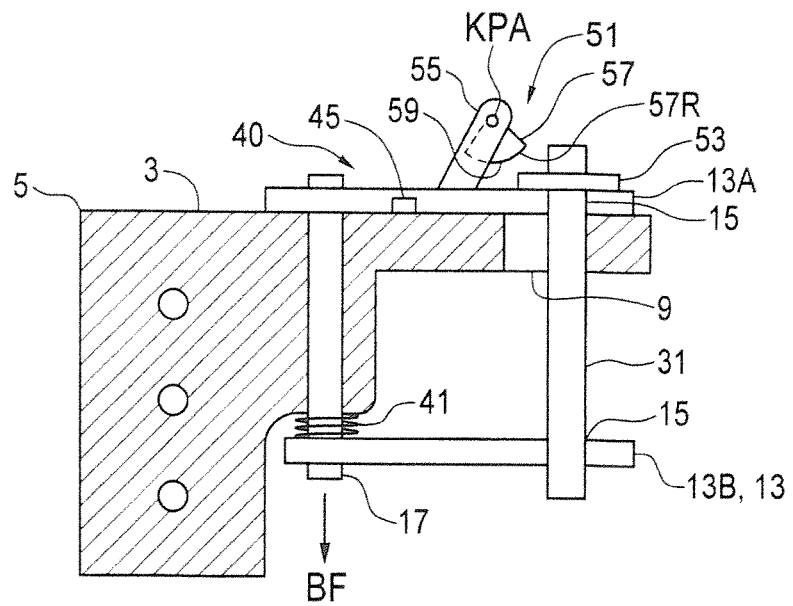
FIG. 7 is a schematic sectional side view of the locking mechanism and a perpendicular retainer of FIG. 6.

FIGS. 6 and 7 schematically illustrate a lock mechanism 40 installed on the apparatus 1 of FIG. 1 where the tongue member 3 is adapted for attachment to a towed vehicle 11A and the upper clevis strap 13A rests on an upper surface of the tongue member 3 such that the recess 21 is formed between the lower clevis strap 13B and the tongue member 3. The lock mechanism 40 is operative to secure the upper and lower clevis straps 13 in the idle and in the operating position.

Figure 8:
FIG. 8 is a schematic side view of a spring suitable to provide the bias element of the lock mechanism.

The lock mechanism 40 includes a bias element, illustrated as a spring 41 installed around the shaft 17 which is movable up and down in the shaft hole 19. In the illustrated lock mechanism 40, the spring 41 is operative to exert a downward bias force BF on the shaft 17 by bearing against the lower clevis strap 13B and against the bottom surface of the tongue member 3. FIG. 8 schematically illustrates a suitable spring 41 that is formed by a resilient spring steel washer with ripples that bend in response to forces on upper and lower surfaces thereof. It is contemplated that other bias elements and arrangements would also be suitable.

The lock mechanism 40 further comprises a lug 45 extending upward from the top surface of the tongue member 35 on each side of the upper clevis strap 13A when the upper clevis strap 13A is in the operating position as illustrated in FIGS. 6 and 7. The lugs 45 of the locking mechanism 40 are operative to secure the upper clevis strap 13A, and thus also the connected lower clevis strap 13B, in the idle position IP, indicated in dotted lines in FIG. 6 and which could be on either side of the tongue member 3, by preventing lateral movement of the upper clevis strap 13A.

The clevis straps 13 are moved to the idle position IP by raising the upper clevis strap 13A against the bias force BF until a bottom surface of the upper clevis strap 13A is above a top end of the lug 45 on a first side 13X of the upper clevis strap 13A, and pivoting the upper clevis strap 13A laterally over the lug 45, and releasing the shaft 17 such that the lug 45 is located on a second side 13Y of the upper clevis strap 13A and the upper clevis strap 13A is prevented by the lug 45 from moving laterally to the operating position.

Figure 9:
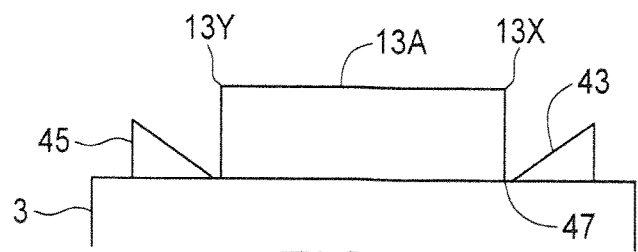
FIG. 9 is a schematic front view of the locking mechanism of FIG. 6.

In the illustrated lock mechanism 40 as can be seen in FIG. 9, the top ends of the lugs 45 form a ramp 43 sloping from inner edges of the lugs 45, located adjacent to corresponding bottom edges 47 of the upper clevis strap 13A, upward to an outer edge of the lug 45. Thus the upper and lower clevis straps 13A, 13B are moved to the idle position by moving the upper clevis strap 13A laterally such that same rides up the ramp 43 and rises against the bias force BF until the second side 13Y of the upper clevis strap 13A clears the outer edge of the lug 45 and then drops down in response to the bias force BF. The vertical outer edges of the lugs 45 keep the upper clevis strap 13A from moving back over the tongue member 3.

FIGS. 6 and 7 also schematically illustrate a drawpin 31 and a drawpin retainer 51 installed on the apparatus 1 of FIG. 1. The drawpin retainer 51 is operative to prevent the drawpin 31 from moving upward out of the drawpin hole 9 and clevis holes 15. The retainer 51 could be mounted directly to the tongue member 3 adjacent to the drawpin hole 9 where no upper clevis strap 13A is used.

The drawpin 31 comprises a flange 53 extending laterally outward from a top portion thereof, and the retainer 31 comprises a bracket 55 attached to a top surface of the upper clevis strap 13A adjacent to the upper clevis hole 15A and the drawpin hole 9 underneath. A retainer key 57 is pivotally attached at an upper portion thereof to the bracket 55 about a substantially horizontal key pivot axis KPA, and the retainer key 57 is configured such that, when hanging freely, a retaining portion 57R of a lower edge 59 of the retainer key 57 extends over at least a portion of the flange 53 when the drawpin 31 is engaged in the upper and lower clevis holes 15A, 15B, or in the drawpin hole 9 in an application where there are no clevis straps 13.

The retainer key 57 has a curved lower edge 59 configured such that when hanging freely, the lower edge 59 of the retainer key 57 is in proximity to the flange 53, and such that the retainer key 57 can pivot about the key pivot axis KPA away from the drawpin 31 toward the vehicle end 5 of the tongue member 3 to allow the drawpin 31 to move upward. The retainer key 57 and bracket 55 are configured such that an upward force exerted by the flange 53 against the lower edge 59 of the retainer key 57 will not rotate the retainer key about the key pivot axis KPA, but rather jams the retainer key 57 and prevents upward movement of the drawpin 31.

In the illustrated retainer mechanism 51 the bracket 55 comprises a pair of bracket plates 61 forming an elongated slot 63 between the bracket plates 61 that is aligned about with a center of the clevis holes 15, or again where no clevis straps 13 are used the slot 63 is aligned with the center of the drawpin hole 9. The retainer key 57 is located in the slot 63 and is pivotally attached by a key pin 65 through the retainer key 57 and through corresponding holes in upper portions of the bracket plates 61. The illustrated retainer key 57 is a half moon key that gravity holds in a locked position and an operator has to manually pivot it to release the draw pin 31 to be removed.

The smaller diameter drawpin 31 can be inserted into the upper and lower clevis holes 15A, 15B when the upper and lower clevis straps 13A, 13B are in the idle position, and the drawpin retainer 51 will keep the drawpin in place such that the proper size drawpin is always available when it is desired to use the clevis hitch mode of the hitch apparatus 1. A conventional safety pin can be attached to one of the clevis straps 13 by a chain, and inserted through a hole in the bottom of the drawpin 31 to provide redundant security of the drawpin both when in use or when idle. Safety regulations may also require such a safety pin.

The present invention thus conveniently provides a hitch apparatus that can be converted from a ring hitch for use with a pintle hook or clevis hitch, to a clevis hitch for use with a single hitch tongue, drawbar, or the like. A drawpin retainer is operative to conveniently prevent upward movement of the drawpin from engagement with the clevis or drawpin and can be conveniently moved to a release position to allow the drawpin to be removed. No tools are required to move the hitch apparatus from a ring hitch mode to a clevis hitch mode, or to release the drawpin retainer.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A hitch apparatus comprising:
   a tongue member having a vehicle end, a free end opposite the vehicle end, and a drawpin hole defined through the tongue member in proximity to the free end;
   wherein the vehicle end of the tongue member is adapted for attachment to a vehicle such that the drawpin hole is oriented substantially vertically;
   an upper clevis strap pivotally attached to a top side of the tongue member about a substantially vertical top pivot axis located between the drawpin hole and the vehicle end of the tongue member such that the upper clevis strap can pivot from an operating position, where the upper clevis strap is above the drawpin hole, to an idle position, where the upper clevis strap extends laterally from the tongue member;
   a lower clevis strap pivotally attached to a bottom side of the tongue member about a substantially vertical bottom pivot axis located between the drawpin hole and the vehicle end of the tongue member such that the lower clevis strap can pivot from an operating position, where the lower clevis strap is below the drawpin hole, to an idle position, where the lower clevis strap extends laterally from the tongue member;
   wherein the upper and lower clevis straps define corresponding substantially vertically oriented upper and lower clevis holes;
   wherein the upper and lower clevis straps are configured such that when the upper and lower clevis straps are in the operating position, the upper and lower clevis holes are vertically aligned with the drawpin hole in the tongue member, and such that a recess is formed between one of the upper and lower clevis straps and the tongue member.

2. The apparatus of claim 1 wherein the upper and lower clevis straps are attached to a shaft extending substantially vertically through a shaft hole in the tongue member and coinciding with the top and bottom pivot axes, the attachment such that the upper and lower clevis holes are aligned, and such that the upper and lower clevis straps pivot together.

3. The apparatus of claim 2 wherein the tongue member is adapted for attachment to a towing vehicle, and wherein the recess is formed between the upper clevis strap and the tongue member.

4. The apparatus of claim 2 wherein the tongue member is adapted for attachment to a towed vehicle, and wherein the recess is formed between the lower clevis strap and the tongue member.

5. The apparatus of claim 2 wherein the upper and lower clevis holes have a smaller diameter than a diameter of the drawpin hole, and wherein the drawpin hole is substantially cylindrical and includes a notch extending toward the free end of the tongue member from the cylindrical portion thereof, and wherein when the upper and lower clevis straps are in the operating position, edges of the upper and lower clevis holes are substantially aligned with edges of the notch.

6. The apparatus of claim 5 further comprising a drawpin with a diameter substantially the same as the diameter of the upper and lower clevis holes, and wherein the drawpin is slidingly engaged in the upper and lower clevis holes and the notch such that lateral movement of the drawpin in the drawpin hole is substantially prevented.

7. The apparatus of claim 2 comprising a lock mechanism operative to secure the upper and lower clevis straps in the idle position.

8. The apparatus of claim 7 wherein
   the tongue member is adapted for attachment to a towed vehicle and wherein the upper clevis strap rests on an upper surface of the tongue member such that the recess is formed between the lower clevis strap and the tongue member;
   the shaft is movable up and down in the shaft hole, and a bias element is operative to exert a downward bias force on the shaft;
   wherein the lock mechanism comprises a lug extending upward from the top surface of the tongue member on a first side of the upper clevis strap when the upper clevis strap is in the operating position;
   wherein the upper and lower clevis straps are moved to the idle position by raising the upper clevis strap against the bias force until a bottom surface of the upper clevis strap is above a top end of the lug, and pivoting the upper clevis strap laterally over the lug, and releasing the shaft such that the lug is located on a second side of the upper clevis strap and the upper clevis strap is prevented by the lug from moving laterally to the operating position.

9. The apparatus of claim 8 wherein the lock mechanism comprises a second lug extending upward from the top surface of the tongue member on the second side of the upper clevis strap when the upper clevis strap is in the operating position.

10. The apparatus of claim 8 wherein the to end of the lug forms a ramp sloping from an inner edge of the lug, located adjacent to a corresponding bottom edge of the upper clevis strap, upward to an outer edge of the lug, and wherein the upper and lower clevis straps are moved to the idle position by moving the upper clevis strap laterally such that same rides up the ramp and rises against the bias force.

11. The apparatus of claim 2 comprising a drawpin and a drawpin retainer operative to prevent he drawpin from moving upward out of the drawpin hole.

12. The apparatus of claim 11 wherein the drawpin comprises a flange extending laterally outward from a top portion thereof and wherein the retainer comprises a bracket attached to a top surface of the upper clevis strap adjacent to the upper clevis hole, and a retainer key pivotally attached at an upper portion thereof to the bracket about a substantially horizontal key pivot axis, and wherein the retainer key is configured such that, when hanging freely, a retaining portion of a lower edge of the retainer key extends over at least a portion of the flange when the drawpin is engaged in the upper and lower clevis holes.

13. The apparatus of claim 12 wherein the retainer key has a curved lower edge configured such that when hanging freely, the lower edge of the retainer key is in proximity to the flange, and such that the retainer key can pivot about the key pivot axis away from the drawpin to allow the drawpin to move upward.

14. The apparatus of claim 13 wherein the retainer key and bracket are configured such that an upward force exerted by the flange against the lower edge of the retainer key jams the retainer key and prevents upward movement of the drawpin.

15. The apparatus of claim 13 wherein the bracket comprises a pair of bracket plates forming an elongated slot between the bracket plates aligned about with a center of the drawpin hole, and wherein the retainer key is located in the slot and is pivotally attached by a key pin through the retainer key and through corresponding holes in upper portions of the bracket plates.

\* \* \* \* \*

UNITED STATES PATENT AND TRADEMARK OFFICE
CERTIFICATE OF CORRECTION

| | | |
|---|---|---|
| PATENT NO. | : 8,616,576 B2 | Page 1 of 1 |
| APPLICATION NO. | : 13/433978 | |
| DATED | : December 31, 2013 | |
| INVENTOR(S) | : Brian R. Olson | |

It is certified that error appears in the above-identified patent and that said Letters Patent is hereby corrected as shown below:

In the Claims

Column 8, line 66, Claim 11, please replace "he" with -- the --.

Signed and Sealed this
Ninth Day of December, 2014

Michelle K. Lee
*Deputy Director of the United States Patent and Trademark Office*